(12) United States Patent
Coomer et al.

(10) Patent No.: US 8,353,035 B1
(45) Date of Patent: Jan. 8, 2013

(54) SYSTEMS AND METHODS FOR CREATING TEXT SIGNATURES FOR IDENTIFYING SPAM MESSAGES

(75) Inventors: Graham Coomer, Gloucester (GB); Nicholas Johnston, Cheltenham (GB)

(73) Assignee: Symantec Corporation, Mountain View, CA (US)

( * ) Notice: Subject to any disclaimer, the term of this patent is extended or adjusted under 35 U.S.C. 154(b) by 493 days.

(21) Appl. No.: 12/633,111

(22) Filed: Dec. 8, 2009

(51) Int. Cl.
*G06F 7/04* (2006.01)
*H04L 9/32* (2006.01)

(52) U.S. Cl. .............. 726/22; 726/23; 726/24; 726/25; 726/26; 713/187; 713/188; 713/189

(58) Field of Classification Search .............. 726/22
See application file for complete search history.

(56) References Cited

U.S. PATENT DOCUMENTS 7,293,063 B1    11/2007  Sobel
8,024,280 B2 *   9/2011  Jessus et al. ................ 706/47

OTHER PUBLICATIONS

Scambuster419.co.ut; 419 Advance Fee Fraud; http://www.scambuster419.co.uk/introduction.htm; Taken from site Oct. 20, 2009.
Consumer Fraud Reporting; Scam Money Transfers; http://www.consumerfraudreporting.org/WindowScams_MrsKateSoloman.php; Taken from site Oct. 20, 2009.
Ehrler Frederic; Text Mining Applied to SPAM Detection; University of Geneva; Jan. 24, 2007.

* cited by examiner

*Primary Examiner* — Longbit Chai
(74) *Attorney, Agent, or Firm* — Advantedge Law Group

(57) ABSTRACT

A computer-implemented method for creating text signatures for identifying spam messages may include: 1) identifying a spam message, 2) tokenizing the text of the spam message, 3) identifying at least one incorrectly punctuated token within the tokenized text of the spam message, 4) identifying, within the tokenized text of the spam message, at least one token that is adjacent to the incorrectly punctuated token, and then 5) creating a candidate signature for identifying future instances and/or variations of the spam message that includes both the incorrectly punctuated token and the token that is adjacent to the incorrectly punctuated token. Corresponding systems and configured computer-readable media are also disclosed.

19 Claims, 7 Drawing Sheets

Spam Message 400

From: pfrancis@example.com
To: mgrant@example.com
Subject: YOUR PAYMENT HAVE BEEN RELEASE
Sent: Wed, 20 Oct 2009 14:26:15

DEAR MR. GRANT,

AUTOMATIC STOP ORDER ON RELEASING OF YOUR OUTSTANDING CONTRACT PAYMENT.

Line 402 — THIS IS TO FORMALLY INFORM YOU THAT I, JUSTICE PHILIP FRANCIS, CHAIRMAN, INDEPENDENT CORRUPT PRACTICES COMMISSION, IS THE PERSON WHO IS MAKING IT PRACTICILLY IMPOSSIBLE FOR YOU TO RECEIVE YOUR PAYMENT FROM THE NIGERIAN GOVERNMENT AFTER CONCLUDING ALL OF YOUR CONTRACT TO SATISFACTION .

THE REAL CAUSE OF IT IS BECAUSE SOME TIME IN THE PAST YOUR SO CALL LOCAL REPRESENTATIVES CAME TO MY OFFICE TO SOLICIT FOR MY HELP IN ORDER TO FINALISE YOUR CONTRACT PAYMENT. WHICH I DID WITH THE AGREEMENT THAT THEY WILL PAY ME MY SERVICE CHARGE AFTER HELPING THEM.

Line 404 — BUT , DO YOU KNOW WHAT IS IT HAPPENED AT LAST? THIS: YOUR AGENTS REFUSED VEHEMENTLY TO PAY ME MY SERVICE CHARGE WHICH NECESSETATED ME TO PLACE AN AUTOMATIC STOP ORDER PENDING WHEN YOU WILL CONTACT ME FOR YOUR PAYMENT.

Line 406 — BE YOU ADVISED THAT BASED ON MY POSITION IN THE GOVERNMENT OF NIGERIA, TODAY I HAVE THE WHEREWITHAL AND PRESIDENTIAL FIAT/POWER TO RELEASE OR NOT TO RELEASE EVERY PAYMENT. MY PROFILE SPEAKS VOLUMES OF WHAT I CAN BE ABLE,TO DO AND REMMEMBER THAT WITHOUT ME NOBODY CAN EVER RELEASE YOUR PAYMENT.

Line 408 — DR. WRIGHT ASKED ME,TO CONTACT YOU BECAUSE YOUR PAYMENT HAS BEEN LINGERING FOR A VERY LONG TIME NOW WITHOUT ANY FORESEEN PROGRESS, BUT IF YOU STILL NEED THIS PAYMENT KINDLY CONTACT ME UPON THE RECEIPT OF THIS IMPORTANT AND URGENT MESSAGE.

IF YOU ARE WILLING, I AM READY TO HELP YOU OUT, FOR YOUR AGENTS HERE HAS NO PRESIDENTIAL MANDATE TO EFFECT YOUR PAYMENT.

JUSTICE PHILIP FRANCIS

*FIG. 4*

SYSTEMS AND METHODS FOR CREATING TEXT SIGNATURES FOR IDENTIFYING SPAM MESSAGES

BACKGROUND

The number of unsolicited bulk emails (also known as "spam") transmitted via the Internet has grown consistently over the past decade, with some researchers now estimating that more than 80% of email represents spam. Spam emails annoy consumers, consume precious network bandwidth and resources, and, in some cases, may be used as a vehicle for committing fraud.

Certain types of spam, including but not limited to advance-fee fraud (also known as "419 fraud"), are often typified by poor spelling, punctuation, and/or grammar. For example, an advanced-fee-fraud message may begin with the sentence "Queen Elizabeth of Englandd, in her generosity have noted the overflowing of her coffers." In this example, the author of the message incorrectly added an extra space before the comma, used poor grammar ("Queen Elizabeth . . . have"), and misspelled the word England ("Englandd").

While spam-detection software may detect any one of the above mistakes fairly simply, a number of real-world implementation pitfalls may prevent spam-detection software from accurately detecting such errors without producing false positives. For example, legitimate emails often include misspelled words (e.g., "judgement" [sic] vs. "judgment"). Similarly, the punctuation used in various elements of a legitimate email (e.g., URLs such as "live.in" and numbers such as "4,000") may, despite their accurate usage, appear incorrect within the context of English words and phrases. In addition, conventional spam-detection software may incorrectly classify non-English text (e.g., "hola") as misspellings, potentially producing false positives. As such, the instant disclosure identifies a need for systems and methods for extracting suitable text signatures from a spam message in order to accurately and reliably identify future instances and/or variations of the spam message.

SUMMARY

As will be described in greater detail below, the instant disclosure generally relates to systems and methods for extracting suitable text signatures from a spam message in order to accurately and reliably identify future instances and/or variations of the spam message. In one example, one or more of the various systems described herein may accomplish this task by: 1) identifying a spam message (by, e.g., receiving the spam message via a customer-submission process and/or by retrieving the spam message from a spam trap), 2) tokenizing the text of the spam message, 3) identifying at least one incorrectly punctuated token within the tokenized text of the spam message, 4) identifying, within the tokenized text of the spam message, at least one token that is adjacent to the incorrectly punctuated token, and then 5) creating a candidate signature for identifying future instances and/or variations of the spam message that includes both the incorrectly punctuated token and the one or more tokens that are adjacent to the incorrectly punctuated token. In one example, the systems described herein may tokenize the text of the spam message by: 1) identifying each line of text within the spam message and then 2) tokenizing, in turn, each individual line of text within the spam message.

The systems described herein may identify tokens that are adjacent to the incorrectly punctuated token in a variety of ways. In one example, the systems described herein may simply identify a predetermined number of suitable tokens that precede and/or follow the incorrectly punctuated token (by, e.g., selecting three tokens that precede and three tokens that follow the incorrectly punctuated token). Examples of suitable tokens include tokens that do not include frequently changing or arbitrary text, such as URLs, personal-name titles (such as Dr., Mrs., Sgt., Esq., or the like), dates, times, or the like. In some examples, the systems described herein may disregard superfluous whitespace characters when identifying tokens that are adjacent to the incorrectly punctuated token.

If the systems described herein determine that less than a predetermined number of suitable tokens precede or follow the incorrectly punctuated token, then these systems may automatically compensate for this deficiency by identifying or selecting an additional number of suitable tokens (when available) from a side that opposes the deficient side. For example, if the systems described herein determine that less than three suitable tokens precede an incorrectly punctuated token (if, e.g., the incorrectly punctuated token is located at the beginning of a tokenized line of text or if the one of the three tokens preceding the incorrectly punctuated token is a personal-name title or URL), then the systems described herein may automatically identify an increased number of suitable tokens (e.g., four, as opposed to three) that follow the incorrectly punctuated token.

In some examples, the systems described herein may re-tokenize the candidate signature using, for example, whitespace or punctuation delimiters. In these examples, upon re-tokenizing the candidate signature, the systems described herein may analyze the candidate signature to determine: 1) the number of misspelled words within the candidate signature, 2) the ratio of misspelled words to correctly spelled words within the candidate signature, 3) the ratio of whitespace to non-whitespace characters within the candidate signature, 4) whether all text within the candidate signature is capitalized, and/or 5) the total number of tokens within the candidate signature. The systems described herein may then store information that identifies each of these characteristics as metadata for the candidate signature.

If more than one candidate signature is extracted from a spam message, then the systems described herein may use this metadata to rank the candidate signatures. For example, the systems described herein may rank a candidate signature relative to at least one additional candidate signature associated with the spam message based on: 1) the ratio of misspelled words to correctly spelled words within the candidate signature (since, e.g., spam messages typically contain a relatively high number of misspelled words), 2) whether all text within the candidate signature is capitalized (since, e.g., spam messages tend to contain more capitalized text then non-spam messages), 3) whether the ratio of whitespace to non-whitespace characters within the candidate signature exceeds a predetermined threshold (since, e.g., the amount of whitespace within a spam message may be quickly and easily modified by spammers, and thus hard to duplicate), and/or 4) whether the ratio of misspelled words to correctly spelled words within the candidate signature exceeds a predetermined threshold (since, e.g., messages that contain an abnormally high ratio of misspelled words may contain non-English text).

After ranking each of the candidate signatures associated with a particular spam message, the systems described herein may: 1) select the n highest-ranked candidate signature, 2) include this candidate signature within a spam-detection heuristic, and then 3) apply this spam-detection heuristic to at least one electronic message in an attempt to identify future instances and/or variations of the spam message.

As will be explained in greater detail below, by: 1) dynamically and intelligently expanding spam signatures to meet minimum length requirements, 2) avoiding specific unreliable text elements (such as URLs and titles) when creating these signatures, and/or 3) analyzing and ranking such signatures based on various characteristics (such as misspelling ratios, whitespace ratios, and/or capitalization), the systems and methods described herein may enable security software vendors to create text signatures for accurately and reliably identifying future instances and/or variations of spam messages without producing false positives. Moreover, because research indicates that spammers often reuse templates when creating spam messages, the punctuation-based text signatures created using the systems and methods described herein may retain their accuracy and/or effectiveness longer than conventional keyword or phrase-based text heuristics, URL signatures, or other techniques used to detect spam.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of an exemplary spam message.

Figure 1:
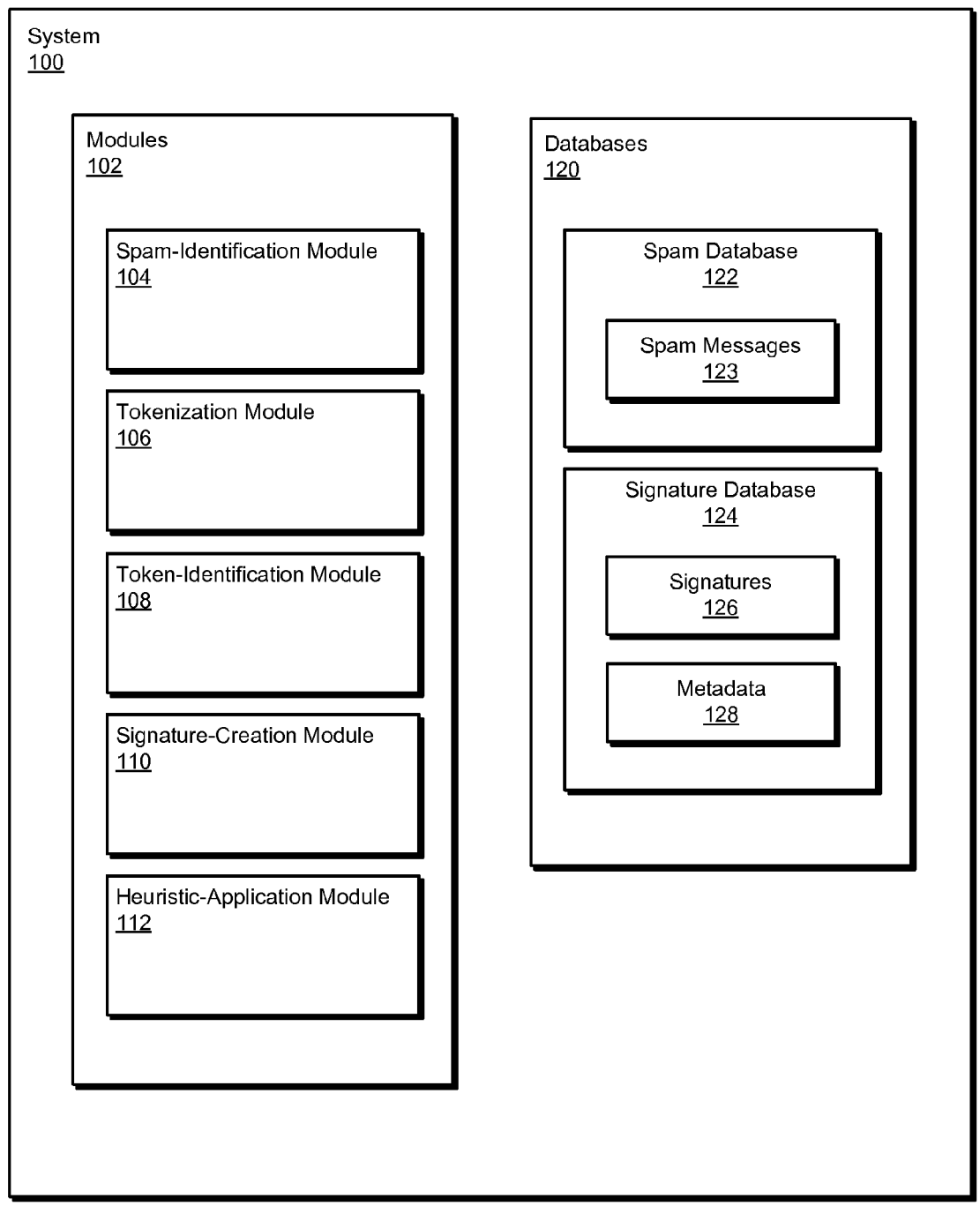
FIG. 1 is a block diagram of an exemplary system for creating text signatures for identifying spam messages.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for creating text signatures for accurately and reliably identifying future instances and/or variations of spam messages. The terms "spam" and "spam message," as used herein, may refer to any type or form of unwanted or unsolicited electronic message. Examples of spam messages include, without limitation, unsolicited electronic messages sent for commercial, fraudulent, malicious, disruptive, and/or abusive purposes. In addition, the terms "message" and "electronic message," as used herein, may refer to any type or form of electronic communication. Examples of electronic messages include, without limitation, emails, instant messages, cellular text messages, message-board postings, tweets, and the like.

Figure 2:
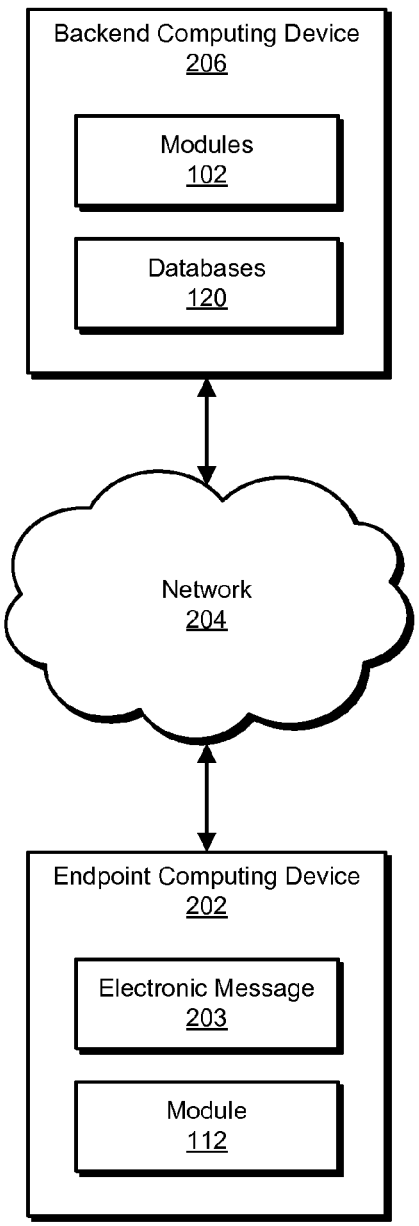
FIG. 2 is a block diagram of an exemplary system for creating text signatures for identifying spam messages.

The following will provide, with reference to FIGS. 1-2, detailed descriptions of exemplary systems for creating text signatures for identifying spam messages. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for creating text signatures for identifying spam messages. As illustrated in this figure, exemplary system 100 may include one or more modules 102 for performing one or more tasks. For example, and as will be explained in greater detail below, exemplary system 100 may include a spam-identification module 104 programmed to identify spam messages. Exemplary system 100 may also include a tokenization module 106 programmed to tokenize the text of spam messages. In addition, exemplary system 100 may include a token-identification module 108 programmed to identify: 1) an incorrectly punctuated token within the tokenized text of a spam message and 2) at least one at least one token that is adjacent to the incorrectly punctuated token.

Exemplary system 100 may also include a signature-creation module 110 programmed to create a candidate signature for identifying future spam messages that includes both the incorrectly punctuated token and the one or more tokens that are adjacent to the incorrectly punctuated token. In addition, exemplary system may include a heuristic-application module 112 programmed to: 1) include the candidate signature within a spam-detection heuristic and 2) apply the spam-detection heuristic to electronic messages in an attempt to identify future instances and/or variations of the spam message. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., endpoint computing device 202 and/or backend computing device 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, databases 120 may include a spam database 122 for storing a plurality of known spam messages 123 (received, e.g., via a customer-submission process and/or retrieved and processed from a spam trap). Databases 120 may also include a signature database 124 for storing signatures 126 for identifying future instances and/or variations of spam messages. Signature database 124 may also contain metadata 128 that identifies various characteristics of each of signatures 126, as will be explained below.

Databases 120 in FIG. 1 may represent a portion of one or more computing devices. For example, databases 120 may represent a portion of endpoint computing device 202 and/or backend computing device 206 in FIG. 2, computing system 610 in FIG. 6, and/or portions of exemplary network architecture 700 in FIG. 7. Alternatively, databases 120 in FIG. 1 may represent one or more physically separate devices capable of being accessed by a computing device, such as endpoint computing device 202 and/or backend computing device 206 in FIG. 2, computing system 610 in FIG. 6, and/or portions of exemplary network architecture 700 in FIG. 7.

Exemplary system 100 in FIG. 1 may be deployed in a variety of ways. For example, all or a portion of exemplary system 100 may represent portions of exemplary system 200 in FIG. 2. As shown in FIG. 2, system 200 may include an endpoint computing device 202 in communication with a backend computing device 206 via a network 204. In one embodiment, and as will be described in greater detail below, one or more of modules 102 may program backend computing device 206 to: 1) identify a spam message (by, e.g., receiving the spam message via a customer-submission process and/or retrieving and processing the spam message from a spam trap), 2) tokenize the text of the spam message, 3) identify at least one incorrectly punctuated token within the tokenized text of the spam message (e.g., incorrectly punctuated token 502 in FIG. 5, 4) identify, within the tokenized text of the spam message, at least one token that is adjacent to the incorrectly punctuated token, and then 5) create a candidate signature (e.g., candidate signature 510 in FIG. 5) for identifying future spam messages that includes both the incorrectly punctuated token and the token that is adjacent to the incorrectly punctuated token.

Endpoint computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Backend computing device 206 generally represents any type or form of computing device that is capable of extracting and/or creating text signatures from spam messages. Examples of backend computing device 206 include, without limitation, application servers and/or database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between endpoint computing device 202 and backend computing device 206.

Figure 3:
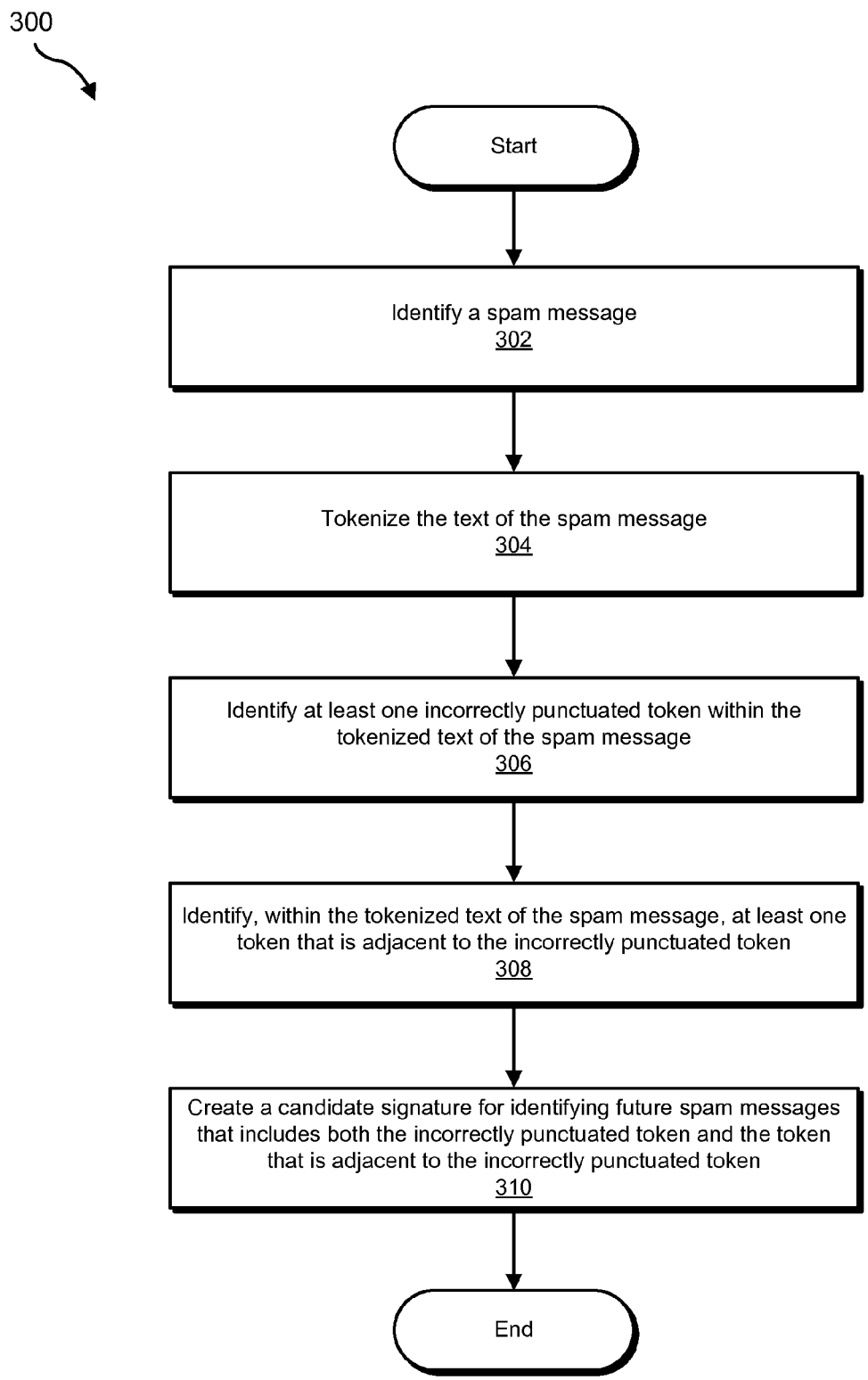
FIG. 3 is a flow diagram of an exemplary method for creating text signatures for identifying spam messages.

FIG. 3 is a flow diagram of an exemplary computer-implemented method 300 for creating text signatures for identifying spam messages. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the various systems described herein may identify a spam message. For example, spam-identification module 104 in FIG. 1 may, as part of backend computing device 202 in FIG. 2, retrieve spam message 400 in FIG. 4 from spam database 122 in FIG. 1.

The systems described herein may identify spam messages in a variety of ways. For example, spam-identification module 104 may, as part of backend computing device 206, receive one or more spam messages via a customer-submission process. Alternatively, spam-identification module 104 may identify and process spam messages caught in a spam trap.

As detailed above, spam message 400 in FIG. 4 may represent any type or form of unwanted or unsolicited electronic message. Examples of spam message 400 include, without limitation, unwanted commercial solicitations, disruptive or abusive messages, phishing attempts, advanced-fee-fraud messages (also known as "419" messages), or the like.

Returning to FIG. 3, at step 304 the systems described herein may tokenize the text of the spam message identified in step 302. For example, tokenization module 106 in FIG. 1 may, as part of backend computing device 206 in FIG. 2, tokenize the text of spam message 400 in FIG. 4.

The terms "tokenize" and "tokenization," as used herein, may refer to a computer-implemented process for parsing or breaking strings of text into meaningful elements or units known as tokens. In addition, a "token" may refer to any word, word pair, or block of text or string of meaningful or identifiable characters.

The systems described herein may tokenize spam messages in a variety of ways. In one example, tokenization module 106 in FIG. 1 may tokenize spam message 400 in FIG. 4 by: 1) identifying each line of text within spam message 400 and then 2) tokenizing, in turn, each individual line of text within spam message 400. For example, tokenization module 106 may extract all relevant text from spam message 400 using MIME decoding and/or HTML stripping techniques. Tokenization module 106 may then separate this stripped or extracted text into individual lines (based on, e.g., line-return and/or formatting characters contained within spam message 400). After identifying each individual line of text within spam message 400, tokenization module 106 may then tokenize each individual line of text, in turn.

In one example, tokenization module 106 in FIG. 1 may tokenize each individual line of text within spam message 400 in FIG. 4 using a punctuation-aware tokenization algorithm or heuristic. For example, instead of simply tokenizing each line of text within spam message 400 using a standard whitespace-delimited technique, tokenization module 106 may tokenize each line of text within spam message 400 using a tokenization method or heuristic that retains or maintains any punctuation errors (such as extra or missing whitespace characters before or after periods or commas) contained within the original text of spam message 400.

Figure 5:
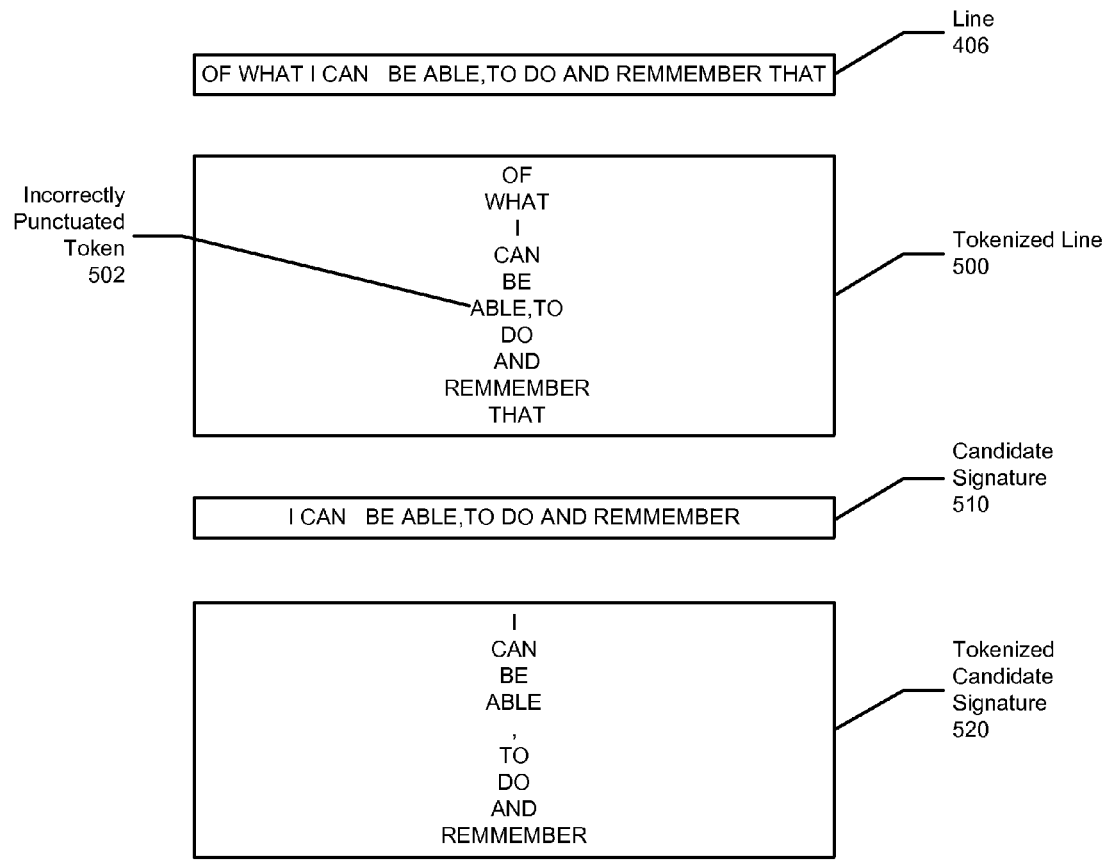
FIG. 5 is a flow diagram of an exemplary method for creating candidate signatures from tokenized lines of text.

For example, as illustrated in FIG. 5, tokenization module 106 may tokenize line 406 ("OF WHAT I CAN BE ABLE,TO DO AND REMEMBER THAT") from spam message 400 in a manner that retains or maintains the punctuation error "ABLE,TO." For example, tokenization module 106 may, when tokenizing line 406, determine that line 406 incorrectly fails to include a whitespace character immediately after the comma that follows the word "ABLE," resulting in the erroneous construction "ABLE,TO." Upon identifying this punctuation error, tokenization module 106 may create a token that contains characters or text sufficient to identify or demonstrate the punctuation error in question. For example, tokenization module 106 may include the words that immediately precede and follow the punctuation error, resulting in the token "ABLE,TO" (as opposed to using standard whitespace or punctuation delimiters to create the tokens "ABLE" "," and "TO").

Tokenization module 106 may create tokens that contain text or characters sufficient to identify or demonstrate punctuation errors in a variety of ways. In some examples, tokenization module 106 may create tokens that contain text or characters sufficient to identify or demonstrate punctuation errors by simply including the words that immediately precede and follow the incorrectly placed punctuation mark within a single token (resulting in tokens such as, e.g., "I, am" or "concluded. I" or "YES! May").

Returning to FIG. 3, at step 306 the systems described herein may identify at least one incorrectly punctuated token within the tokenized text of the spam message. For example, token-identification module 108 in FIG. 1 may, as part of backend computing device 206 in FIG. 2, identify at least one incorrectly punctuated token within the tokenized text of spam message 400 and FIG. 4.

The systems described herein may identify incorrectly punctuated tokens in a variety of ways. For example, token-identification module 108 may identify tokens that contain punctuation marks that are not followed by appropriate whitespace (e.g., "ABLE,TO" in line 406 and "ME,TO" in line 408), punctuation marks that are incorrectly preceded by whitespace (e.g., "SATISFACTION." in line 402 and "BUT, DO" in line 404), or any other type or form of punctuation error.

Returning to FIG. 3, at step 308 the systems described herein may identify at least one token within the tokenized text of the spam message that is adjacent to the incorrectly punctuated token identified in step 306. For example, token-identification module 108 in FIG. 1 may, as part of backend computing device 206 in FIG. 2, identify at least one token that is adjacent to incorrectly punctuated token 502 within tokenized line 500 in FIG. 5.

The phrase "adjacent to," as used herein, may refer to one or more tokens that precede and/or follow an incorrectly punctuated token. For example, the tokens "I," "CAN," and "BE," each of which precedes incorrectly punctuated token 502 in FIG. 5, may be considered as being "adjacent to" incorrectly punctuated token 502. Similarly, the tokens "DO," "AND," and "REMEMBER," each of which follows incorrectly punctuated token 502, may be considered as being "adjacent to" incorrectly punctuated token 502.

The systems described herein may perform step 308 in a variety of ways. In one example, the systems described herein may identify at least one token that is adjacent to the incorrectly punctuated token identified in step 306 by identifying a predetermined number of tokens that precede and/or follow (i.e., surround) the incorrectly punctuated token. For example, token-identification module 108 in FIG. 1 may, as part of backend computing device 206 in FIG. 2, identify three tokens that immediately precede (e.g., "I," "CAN," and "BE") and three tokens that immediately follow (e.g., "DO," "AND," and "REMEMBER") incorrectly punctuated token 502 within tokenized line 500 in FIG. 5.

In some examples, the number of adjacent tokens that are identified by token-identification module 108 may be preselected or preset by a system administrator of backend computing device 206 in FIG. 2. For example, an administrator of backend computing device 206 may instruct token-identification module 108 to identify four, six, eight, or any other number of tokens that are adjacent to (i.e., tokens that precede or follow) the incorrectly punctuated token identified in step 306. Since, as will be discussed in greater detail below in connection with step 310, the accuracy and/or effectiveness of a candidate signature may be affected by the number of adjacent tokens selected by token-identification module 108, administrators of backend computing device 206 may specify the number of adjacent tokens to be identified or selected by token-identification module 108 based on various metrics, including metrics and/or real-world data that identify or demonstrate the accuracy and/or effectiveness of the length of various text signatures.

In one example, the systems described herein may disregard superfluous whitespace characters when identifying tokens that are adjacent to the incorrectly punctuated token identified in step 306. For example, token-identification module 108 may, when identifying tokens that are adjacent to incorrectly punctuated token 502 in FIG. 5, disregard the two superfluous whitespace characters placed between the words "CAN" and "BE" within line 406 (since, in this example, the words "CAN" and "BE" within line 406 in FIGS. 4 and 5 are erroneously separated by three whitespace characters, as opposed to one). In other words, token-identification module 108 may treat the three whitespace characters that separate the words "CAN" and "BE" in line 406 as a single whitespace character, as opposed to treating one or more of these whitespace characters as a token in-and-of itself.

In some examples, token-identification module 108 may perform step 308 by identifying a predetermined number of tokens preceding and/or following the incorrectly punctuated token identified in step 306 that are suitable for inclusion within a candidate signature for the spam message. Examples of tokens that may be suitable for inclusion within a candidate signature include tokens that do not include frequently changing phrases or arbitrary phrases, such as URLs, personal-name titles (e.g., Dr., Mr., Esq., Sgt., or the like), dates, times, or the like. For example, token-identification module 108 may select the adjacent tokens "I," "CAN," "BE," "DO," "AND," and "REMEMBER" from within tokenized line 500 for inclusion within candidate signature 510 in FIG. 5 since none of these tokens contain frequently changing or arbitrary phrases such as URLs, personal-name titles, dates, times, or the like.

If token-identification module 108 determines that less than the required predetermined number of suitable tokens either precede or follow the incorrectly punctuated token identified in step 306, then token-identification module 108 may automatically compensate for this deficiency by identifying or selecting an additional number of suitable tokens (when available) from a side that opposes the deficient side. For example, if token-identification module 108 determines that less than a predetermined number of suitable tokens (e.g., three) precede the incorrectly punctuated token "BUT . DO" within line 404 of spam message 400 in FIG. 4 (since, in this example, this incorrectly punctuated token is positioned at the beginning of line 404), then token-identification module 108 may automatically compensate for this deficiency by identifying an increased number of suitable tokens (e.g., six tokens, as opposed to three) that follow the incorrectly punctuated token (e.g., "YOU," "KNOW," "WHAT," "IS," "IT," and "HAPPENED") in order to compensate for the lack of suitable tokens preceding the incorrectly punctuated token.

Similarly, token-identification module 108 may identify six tokens (e.g., "CONCLUDING," "ALL," "OF," "YOUR,"

"CONTRACT," and "TO") that precede the incorrectly punctuated token "SATISFACTION." within line 402 of spam message 400 in order to compensate for a lack of suitable tokens that follow this incorrectly punctuated token since, in this example, the incorrectly punctuated token appears at the end of line 402. In addition, token-identification module 108 may identify four suitable tokens (e.g., "CONTACT," "YOU," "BECAUSE," and "YOUR") that follow the incorrectly punctuated token "ME,TO" within line 408, as opposed to merely identifying three suitable tokens that follow this incorrectly punctuated token, since the token "DR." (which represents the third token preceding the incorrectly punctuated token) contains a personal-name title that is unsuitable for inclusion within a candidate signature for spam message 400.

Returning to FIG. 3, at step 310 one or more of the various systems described herein may create a candidate signature for identifying future spam messages that includes both the incorrectly punctuated token identified in step 306 and the adjacent tokens identified in step 308. For example, signature-creation module 110 in FIG. 1 may, as part of backend computing device 206 in FIG. 2, create a candidate signature 510 from tokenized line 500 in FIG. 5 for identifying future instances and/or variations of spam message 400 in FIG. 4. In the example illustrated in FIG. 5, candidate signature 510 may include both: 1) incorrectly punctuated token 502 ("ABLE,TO") and 2) three suitable tokens that precede ("I," "CAN," and "BE") and three suitable tokens that follow ("DO," "AND," and "REMEMBER") incorrectly punctuated token 502.

The systems described herein may perform step 310 in a variety of ways. In some examples, signature-creation module 110 may create a candidate signature that retains any superfluous whitespace characters originally contained within the pre-tokenized body of the spam message. For example, signature-creation module 110 may, when creating candidate signature 510, retain the two superfluous whitespace characters originally (and erroneously) placed between the words "CAN" and "BE" in line 406, resulting in the following construction of candidate signature 510: "I CAN  BE ABLE,TO DO AND REMEMBER." Upon completion of step 310, exemplary method 300 in FIG. 3 may terminate.

In some examples, the various systems described herein may, upon creating a candidate signature, re-tokenize the candidate signature using whitespace and/or punctuation delimiters. For example, tokenization module 106 may, upon creation of candidate signature 510 in step 310, re-tokenize candidate signature 510 using whitespace delimiters, resulting in tokenized candidate signature 520 in FIG. 5.

In some examples, signature-creation module 110 may then analyze the re-tokenized candidate signature in order to determine the potential accuracy and/or effectiveness of the candidate signature. For example, signature-creation module 110 may determine, by analyzing tokenized candidate signature 520: 1) the number of misspelled words (or unique misspelled words) within candidate signature 520 (in this example, one), 2) the ratio of misspelled words to correctly spelled words within candidate signature 510 (in this example, 1:7), 3) the ratio of whitespace to non-whitespace characters within candidate signature 510 (in this example, 9:27), 4) whether all text within candidate signature 510 is capitalized (in this example, yes), and/or 5) the total number of tokens within candidate signature 510 (in this example, seven).

In some examples, signature-creation module 110 may then create metadata for the candidate signature that contains all or a portion of this information. For example, signature-creation module 110 may create metadata for candidate signature 510 that identifies: 1) the number of misspelled words (or unique misspelled words) within candidate signature 520 (in this example, one), 2) the ratio of misspelled words to correctly spelled words within candidate signature 510 (in this example, 1:7), 3) the ratio of whitespace to non-whitespace characters within candidate signature 510 (in this example, 9:27), 4) whether all text within candidate signature 510 is capitalized (in this example, yes), and/or 5) the total. Upon creating this metadata, signature-creation module 110 may store the same within signature database 120 in FIG. 1.

In one example, the systems described herein may use this metadata to rank the candidate signature created in step 310 relative to at least one additional candidate signature associated with the spam message identified in step 302. For example, signature-creation module 110 may use the metadata associated with candidate signature 510 to rank candidate signature 510 relative to additional candidate signatures associated with spam message 400. For example, signature-creation module 110 may rank these candidate signatures based on each signature's ratio of misspelled words to correctly spelled words, whether each candidate signature contains text that is in a single case (i.e., upper or lower), whether each candidate signature has a ratio of whitespace to non-whitespace characters that exceeds a predetermined threshold, whether each candidate signature has a ratio of misspelled words to correctly spelled words that exceeds a predetermined threshold, or the like.

For example, signature-creation module 110 may rank a first candidate signature higher than a second candidate signature if the first candidate signature has a ratio of misspelled words to correctly spelled words that is higher than the second candidate signature since spam messages typically contain a relatively high number of misspelled words. However, if the ratio of misspelled words to correctly spelled words within the first candidate signature exceeds a predetermined threshold (such as over 90%), then signature-creation module 110 may rank the first candidate signature lower than the second candidate signature and/or disregard the first candidate signature altogether since this abnormally high ratio may indicate that the first candidate signature contains non-English text.

Similarly, signature-creation module 110 may rank a first candidate signature higher than a second candidate signature if the entirety of the first candidate signature is capitalized since spam messages tend to contain more capitalized text then non-spam messages. However, if a ratio of whitespace to non-whitespace characters within the first candidate signature exceeds a predetermined threshold (e.g., 50%), then signature-creation module 110 may rank the first candidate signature lower than the second candidate signature and/or disregard the first candidate signature altogether since messages containing large amounts of whitespace are unlikely to be resent with exactly the same amount of whitespace and/or with whitespace in the same position, making candidate signatures that include such spacing comparatively less effective.

After ranking each of the candidate signatures associated with a particular spam message, signature-creation module 110 may: 1) select the n highest-ranked candidate signature, 2) include this candidate signature within a spam-detection heuristic, and then 3) apply this spam-detection heuristic to at least one electronic message in an attempt to determine whether the electronic message represents a spam message. For example, signature-creation module 110 may determine, by comparing the metadata for all candidate signatures that are associated with spam message 400 in FIG. 4, that candidate signature 510 in FIG. 5 represents the n highest-ranked candidate signature associated with spam message 400. In this example, heuristic-application module 112 may include candidate signature 510 within a spam-detection heuristic that may be deployed on backend computing device 206 and/or endpoint computing device 202 in FIG. 2 in order to detect future instances and/or variations of spam message 400. For example, heuristic-application module 112 on endpoint computing device 202 may apply a spam-detection heuristic that includes candidate signature 510 to electronic message 203 in order to determine whether this message represents an instance and/or variation of spam message 400.

As explained above, by: 1) dynamically and intelligently expanding spam signatures to meet minimum length requirements, 2) avoiding specific unreliable text elements (such as URLs and titles) when creating these signatures, and/or 3) analyzing and ranking such signatures based on various characteristics (such as misspelling ratios, whitespace ratios, and/or capitalization), the systems and methods described herein may enable security software vendors to create text signatures for accurately and reliably identifying future instances and/or variations of spam messages without producing false positives. Moreover, because research indicates that spammers often reuse templates when creating spam messages, the punctuation-based text signatures created using the systems and methods described herein may retain their accuracy and/or effectiveness longer than conventional keyword or phrase-based text heuristics, URL signatures, or other techniques used to detect spam.

Figure 6:
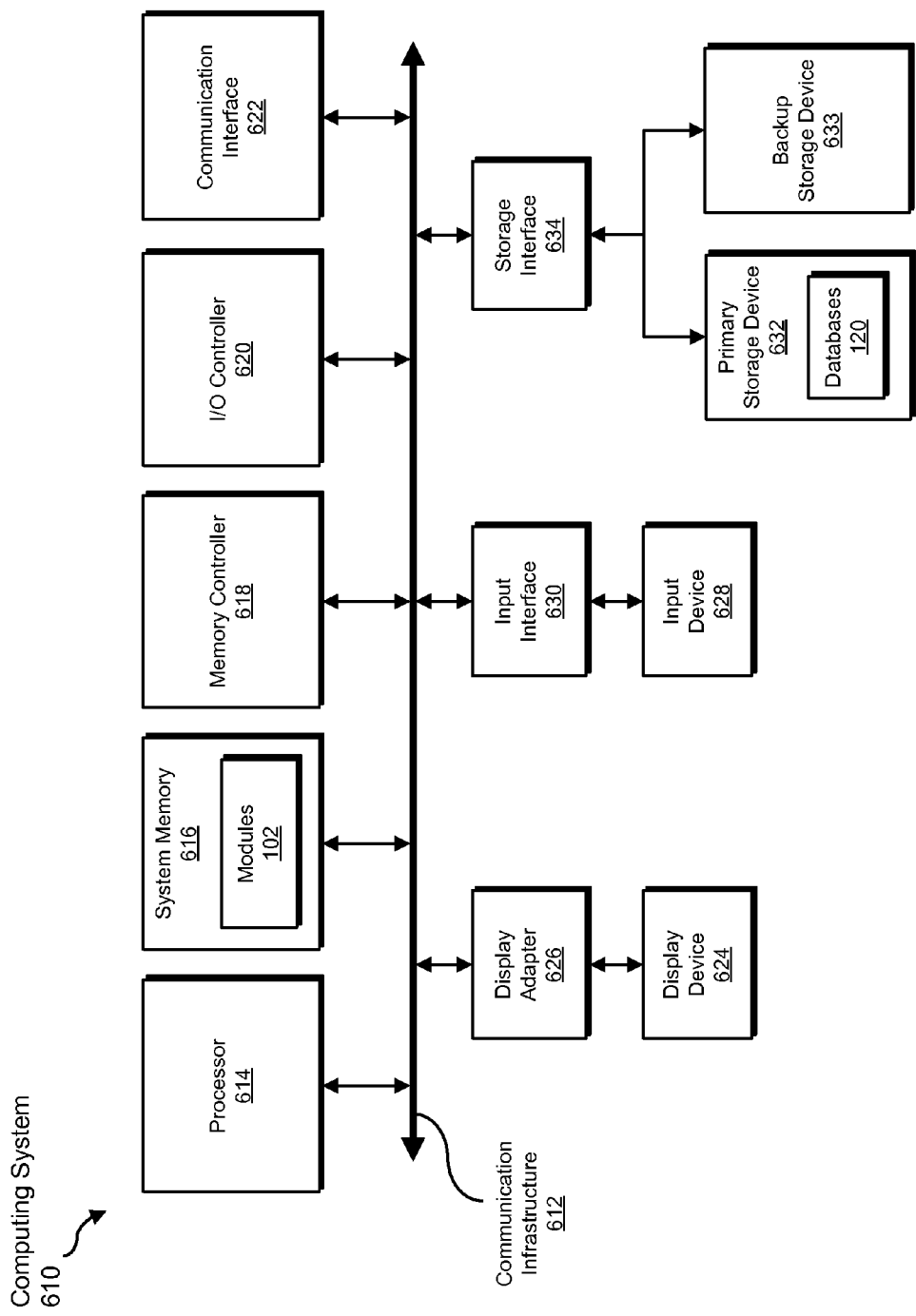
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, tokenizing, creating, determining, compensating, disregarding, using, ranking, including, applying, and deploying steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, tokenizing, creating, determining, compensating, disregarding, using, ranking, including, applying, and deploying.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, tokenizing, creating, determining, compensating, disregarding, using, ranking, including, applying, and deploying steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, tokenizing, creating, determining, compensating, disregarding, using, ranking, including, applying, and deploying steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, tokenizing, creating, determining, compensating, disregarding, using, ranking, including, applying, and deploying steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, databases 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, tokenizing, creating, determining, compensating, disregarding, using, ranking, including, applying, and deploying steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
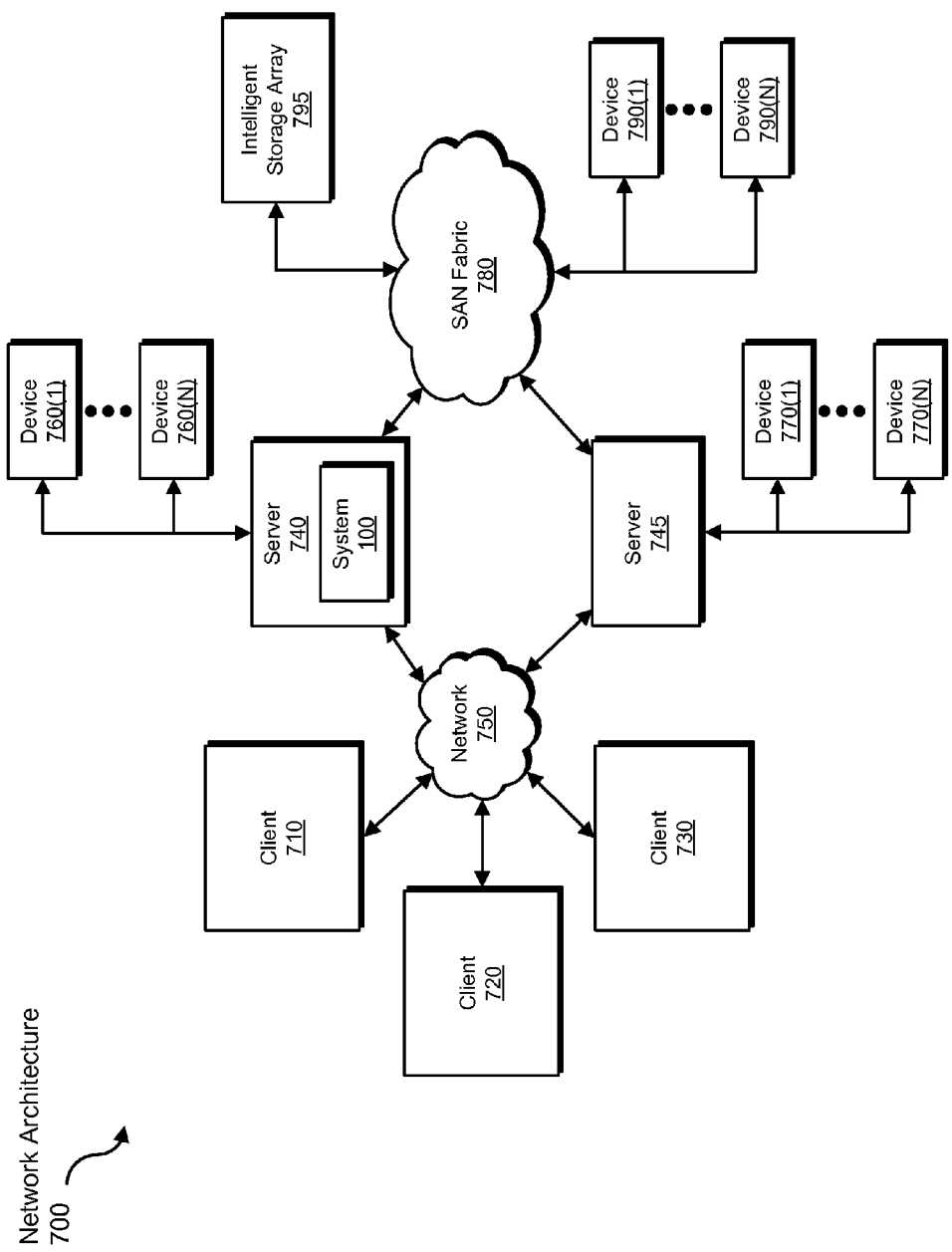
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, tokenizing, creating, determining, compensating, disregarding, using, ranking, including, applying, and deploying steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for creating text signatures for identifying spam messages. In one example, such a method may include: 1) identifying a spam message, 2) tokenizing the text of the spam message, 3) identifying at least one incorrectly punctuated token within the tokenized text of the spam message, 4) identifying, within the tokenized text of the spam message, at least one token that is adjacent to the incorrectly punctuated token, and then 5) creating a candidate signature for identifying future instances and/or variations of the spam message that includes both the incorrectly punctuated token and the token that is adjacent to the incorrectly punctuated token.

In one example, tokenizing the text of the spam message may include: 1) identifying each line of text within the spam message and then 2) tokenizing, in turn, each individual line of text within the spam message. In one example, identifying at least one token that is adjacent to the incorrectly punctuated token may include disregarding superfluous whitespace characters. Identifying at least one token that is adjacent to the incorrectly punctuated token may also include: 1) identifying a predetermined number of tokens preceding the incorrectly punctuated token that are suitable for inclusion in the candidate signature and/or 2) identifying a predetermined number of tokens following the incorrectly punctuated token that are suitable for inclusion in the candidate signature.

In some examples, identifying a predetermined number of tokens preceding the incorrectly punctuated token that are suitable for inclusion in the candidate signature may include identifying three tokens preceding the incorrectly punctuated token that are suitable for inclusion in the candidate signature. Similarly, identifying a predetermined number of tokens following the incorrectly punctuated token that are suitable for inclusion in the candidate signature may include identifying three tokens following the incorrectly punctuated token that are suitable for inclusion in the candidate signature. Examples of tokens that are suitable for inclusion in the candidate signature include tokens that do not include URLs, personal-name titles, dates, and/or times.

In one example, identifying at least one token that is adjacent to the incorrectly punctuated token may include: 1) determining that less than a predetermined number of suitable tokens precede the incorrectly punctuated token and then 2) automatically compensating for a lack of suitable tokens preceding the incorrectly punctuated token by identifying an increased number of tokens following the incorrectly punctuated token that are suitable for inclusion in the candidate signature. Additionally or alternatively, identifying at least one token that is adjacent to the incorrectly punctuated token may include: 1) determining that less than a predetermined number of suitable tokens follow the incorrectly punctuated token and then 2) automatically compensating for a lack of suitable tokens following the incorrectly punctuated token by identifying an increased number of tokens preceding the incorrectly punctuated token that are suitable for inclusion in the candidate signature.

In one example, the method may also include tokenizing the candidate signature. In this example, the method may also include determining the number of misspelled words within the candidate signature, the ratio of misspelled words to correctly spelled words within the candidate signature, the ratio of whitespace to non-whitespace characters within the candidate signature, whether all text within the candidate signature is capitalized, and/or the total number of tokens within the candidate signature. In one example, determining the number of misspelled words within the candidate signature may include determining the number of unique misspelled words within the candidate signature.

In some examples, the method may also include creating metadata for the candidate signature that identifies the number of misspelled words within the candidate signature, the ratio of misspelled words to correctly spelled words within the candidate signature, the ratio of whitespace to non-whitespace characters within the candidate signature, whether all text within the candidate signature is capitalized, and/or the total number of tokens within the candidate signature.

In one example, the method may also include using the metadata to rank the candidate signature relative to at least one additional candidate signature associated with the spam message. In this example, using the metadata to rank the candidate signature relative to at least one additional candidate signature associated with the spam message may include ranking the candidate signature based on the ratio of misspelled words to correctly spelled words within the candidate signature, whether all text within the candidate signature is capitalized, whether the ratio of whitespace to non-whitespace characters within the candidate signature exceeds a predetermined threshold, and/or whether the ratio of misspelled words to correctly spelled words within the candidate signature exceeds a predetermined threshold.

In some examples, the method may also include: 1) determining that the candidate signature represents the n highest-ranked candidate signature associated with the spam message, 2) including the candidate signature in a spam-detection heuristic, and then 3) applying the spam-detection heuristic to at least one electronic message in an attempt to determine whether the electronic message represents a spam message. In these examples, applying the spam-detection heuristic may include deploying the spam-detection heuristic on an endpoint computing device and/or a backend computing device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, signature-creation module 110 in FIG. 1 may transform a property and/or characteristic of backend computing device 206 in FIG. 2 (e.g., a characteristic and/or property of databases 120 of backend computing device 206) by creating and storing candidate signatures for spam messages within signature database 124 in databases 120.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive.

Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for creating text signatures for identifying spam messages, the method comprising:
   identifying a spam message;
   tokenizing the text of the spam message;
   identifying at least one incorrectly punctuated token within the tokenized text of the spam message;
   identifying, within the tokenized text of the spam message, at least two tokens that are adjacent to the incorrectly punctuated token by at least one of:
      identifying a predetermined number of tokens preceding the incorrectly punctuated token that are suitable for inclusion in a candidate signature;
      identifying a predetermined number of tokens following the incorrectly punctuated token that are suitable for inclusion in the candidate signature;
   creating the candidate signature for identifying future spam messages that includes both the incorrectly punctuated token and the tokens that are adjacent to the incorrectly punctuated token;
   wherein at least a portion of the method is performed by a computing device comprising at least one processor.

2. The method of claim 1, wherein tokenizing the text of the spam message comprises:
   identifying each line of text within the spam message;
   tokenizing each line of text within the spam message.

3. The method of claim 1, wherein:
   identifying the predetermined number of tokens preceding the incorrectly punctuated token that are suitable for inclusion in the candidate signature comprises identifying three tokens preceding the incorrectly punctuated token that are suitable for inclusion in the candidate signature;

identifying the predetermined number of tokens following the incorrectly punctuated token that are suitable for inclusion in the candidate signature comprises identifying three tokens following the incorrectly punctuated token that are suitable for inclusion in the candidate signature.

4. The method of claim 1, wherein the tokens that are suitable for inclusion in the candidate signature comprise tokens that do not include at least one of:
Uniform Resource Locators;
personal-name titles;
dates;
times.

5. The method of claim 1, wherein identifying the tokens that are adjacent to the incorrectly punctuated token comprises:
determining that less than a predetermined number of suitable tokens precede the incorrectly punctuated token;
automatically compensating for a lack of suitable tokens preceding the incorrectly punctuated token by identifying an increased number of tokens following the incorrectly punctuated token that are suitable for inclusion in the candidate signature.

6. The method of claim 1, wherein identifying the tokens that are adjacent to the incorrectly punctuated token comprises:
determining that less than a predetermined number of suitable tokens follow the incorrectly punctuated token;
automatically compensating for a lack of suitable tokens following the incorrectly punctuated token by identifying an increased number of tokens preceding the incorrectly punctuated token that are suitable for inclusion in the candidate signature.

7. The method of claim 1, wherein identifying the tokens that are adjacent to the incorrectly punctuated token comprises disregarding superfluous whitespace characters.

8. The method of claim 1, further comprising tokenizing the candidate signature.

9. The method of claim 8, further comprising determining at least one of:
the number of misspelled words within the candidate signature;
the ratio of misspelled words to correctly spelled words within the candidate signature;
the ratio of whitespace to non-whitespace characters within the candidate signature;
whether all text within the candidate signature is capitalized;
the total number of tokens within the candidate signature.

10. The method of claim 9, wherein determining the number of misspelled words within the candidate signature comprises determining the number of unique misspelled words within the candidate signature.

11. The method of claim 9, further comprising creating metadata for the candidate signature that identifies at least one of:
the number of misspelled words within the candidate signature;
the ratio of misspelled words to correctly spelled words within the candidate signature;
the ratio of whitespace to non-whitespace characters within the candidate signature;
whether all text within the candidate signature is capitalized;
the total number of tokens within the candidate signature.

12. The method of claim 11, further comprising using the metadata to rank the candidate signature relative to at least one additional candidate signature associated with the spam message.

13. The method of claim 12, wherein using the metadata to rank the candidate signature relative to at least one additional candidate signature associated with the spam message comprises ranking the candidate signature based on at least one of:
the ratio of misspelled words to correctly spelled words within the candidate signature;
whether all text within the candidate signature is capitalized;
whether the ratio of whitespace to non-whitespace characters within the candidate signature exceeds a predetermined threshold;
whether the ratio of misspelled words to correctly spelled words within the candidate signature exceeds a predetermined threshold.

14. The method of claim 13, further comprising:
determining that the candidate signature represents the n highest-ranked candidate signature associated with the spam message;
including the candidate signature in a spam-detection heuristic;
applying the spam-detection heuristic to at least one electronic message in an attempt to determine whether the electronic message represents a spam message.

15. The method of claim 14, wherein applying the spam-detection heuristic comprises:
deploying the spam-detection heuristic on an endpoint computing device;
deploying the spam-detection heuristic on a backend computing device.

16. A system for creating signatures for identifying spam messages, the system comprising:
a spam-identification module programmed to identify a spam message;
a tokenization module programmed to tokenize the text of the spam message;
a token-identification module programmed to:
identify at least one incorrectly punctuated token within the tokenized text of the spam message;
identify, within the tokenized text of the spam message, at least two tokens that are adjacent to the incorrectly punctuated token by at least one of:
identifying a predetermined number of tokens preceding the incorrectly punctuated token that are suitable for inclusion in a candidate signature;
identifying a predetermined number of tokens following the incorrectly punctuated token that are suitable for inclusion in the candidate signature;
a signature-creation module programmed to create a candidate signature for identifying future spam messages that includes both the incorrectly punctuated token and the tokens that are adjacent to the incorrectly punctuated token;
at least one processor configured to execute the spam-identification module, the tokenization module, the token-identification module, and the signature-creation module.

17. The system of claim 16, wherein the signature-creation module is further programmed to create metadata for the candidate signature that identifies at least one of:
the number of misspelled words within the candidate signature;

the ratio of misspelled words to correctly spelled words within the candidate signature;

the ratio of whitespace to non-whitespace characters within the candidate signature;

whether all text within the candidate signature is capitalized;

the total number of tokens within the candidate signature.

18. The system of claim 17, wherein the signature-creation module is further programmed to use the metadata to rank the candidate signature relative to at least one additional candidate signature associated with the spam message based on at least one of:

the ratio of misspelled words to correctly spelled words within the candidate signature;

whether all text within the candidate signature is capitalized;

whether the ratio of whitespace to non-whitespace characters within the candidate signature exceeds a predetermined threshold;

whether the ratio of misspelled words to correctly spelled words within the candidate signature exceeds a predetermined threshold.

19. A non-transitory computer-readable medium comprising computer-executable instructions that, when executed by at least one processor of a computing device, cause the computing device to:

identify a spam message;

tokenize the text of the spam message;

identify at least one incorrectly punctuated token within the tokenized text of the spam message;

identify, within the tokenized text of the spam message, at least two tokens that are adjacent to the incorrectly punctuated token by at least one of:

identifying a predetermined number of tokens preceding the incorrectly punctuated token that are suitable for inclusion in a candidate signature;

identifying a predetermined number of tokens following the incorrectly punctuated token that are suitable for inclusion in the candidate signature;

create the candidate signature for identifying future spam messages that includes both the incorrectly punctuated token and the tokens that are adjacent to the incorrectly punctuated token.

\* \* \* \* \*

UNITED STATES PATENT AND TRADEMARK OFFICE
CERTIFICATE OF CORRECTION

| | | |
|---|---|---|
| PATENT NO. | : 8,353,035 B1 | Page 1 of 1 |
| APPLICATION NO. | : 12/633111 | |
| DATED | : January 8, 2013 | |
| INVENTOR(S) | : Graham Coomer et al. | |

It is certified that error appears in the above-identified patent and that said Letters Patent is hereby corrected as shown below:

Claim 16, at column 20, lines 52 to 56, should read:

a signature-creation module programmed to create the candidate signature for identifying future spam messages that includes both the incorrectly punctuated token and the tokens that are adjacent to the incorrectly punctuated token;

Signed and Sealed this
Ninth Day of April, 2013

Teresa Stanek Rea
*Acting Director of the United States Patent and Trademark Office*